Patented Nov. 7, 1950

2,528,933

UNITED STATES PATENT OFFICE 2,528,933

ADHESIVE COMPOSITION CONTAINING GLYCIDYL ETHERS AND ALUMINA

Quentin T. Wiles, Lafayette, Calif., assignor to Shell Development Company, San Francisco, Calif., a corporation of Delaware No Drawing. Application April 29, 1949, Serial No. 90,542

16 Claims. (Cl. 106—287)

This invention relates to an adhesive composition containing glycidyl ethers and comminuted alumina.

Glycidyl ethers of polyhydric phenols form resinous materials upon addition thereto of a hardening agent. Such resinous materials have good strength and excellent adhesion to surfaces, and consequently, they are suitable for adhesive purposes.

I have now discovered that by incorporating powdered alumina with the glycidyl ether, the resulting composition is curable to a hard, tough material having much greater strength than the cured material devoid of the alumina. Since the glycidyl ether is capable of curing at ordinary atmospheric temperature, the invention provides a new adhesive composition of great utility.

The invention is a composition containing a glycidyl ether of a polyhydric phenol having a 1,2-epoxy equivalency greater than 1.0 in admixture with a substantial amount of powdered alumina. If desired, the composition may also contain a polyglycidyl ether of a polyhydric alcohol and/or a monoglycidyl ether.

The glycidyl ethers of dihydric phenols employed in the composition are obtained by reacting at about 50° C. to 150° C. one to two or more moles of epichlorhydrin with a mole of dihydric phenol in the presence of a base such as sodium, potassium, calcium or barium hydroxide in amount of about 10 to 30% stoichiometric excess of base to epichlorhydrin—i. e., 1.1 to 1.3 equivalents of base per mole of epichlorhydrin. The reaction is effected in aqueous medium by first mixing together the water, dihydric phenol and the base, which mixture is then heated. The epichlorhydrin is added rapidly as a whole and heating is continued with agitation for several hours to convert the reactants to a taffy-like mass. If desired, the base may be added in portions during the course of the reaction. While hot, the agitated reaction product is washed with water until free of base. Although the product is a complex mixture of glycidyl ethers, the principal product may be represented by the formula:

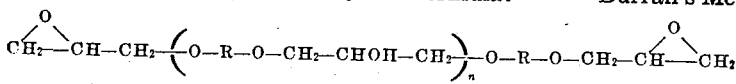

wherein R represents the divalent hydrocarbon radical of the dihydric phenol and $n$ is of the series 0, 1, 2, 3, etc. The length of the chain can be made to vary by changing the molecular proportion of epichlorhydrin to dihydric phenol. Thus by decreasing the moles of epichlorhydrin per mole of dihydric phenol from about two downwards toward one, the molecular weight and the softening point of the resinous glycidyl ether is increased. In general, these glycidyl ethers having an epoxy equivalency between 1.0 and 2.0, contain terminal 1,2-epoxy groups and have alternate aliphatic and aromatic nuclei linked together by ethereal oxygen atoms.

Any of the various dihydric phenols are suitable for preparation of the glycidyl ethers including mononuclear phenols like resorcinol, catechol, hydroquinone, etc., or polynuclear phenols like bis-phenol — i. e., bis-(4-hydroxyphenyl) - 2,2 - propane, or 4,4' - dihydroxybenzophenone, bis-(4-hydroxyphenyl)-1,1-ethane, bis-(4 - hydroxyphenyl) - 1,1-isobutane, bis-(4 - hydroxyphenyl) - 2,2 - butane, bis-(4-hydroxy-2-methylphenyl)-2,2 - propane, bis-(4-hydroxy-2-tertiarybutylphenyl)2,2 - propane, bis - (2-hydroxynaphthyl)-methane, 1,5 - dihydroxynaphthalene, etc.

The following examples illustrate preparation of typical glycidyl ethers employed in the compositions of the invention, wherein the parts are by weight.

EXAMPLE I

A solution consisting of 11.7 parts of water, 1.22 parts of sodium hydroxide, and 13.38 parts of bisphenol was prepared by heating the mixture of ingredients to 70° C. and then cooling to 46° C. at which temperature 14.06 parts of epichlorhydrin were added while agitating the mixture. After 25 minutes had elapsed, there was added during an additional 15 minutes' time a solution consisting of 5.62 parts of sodium hydroxide in 11.7 parts of water. This caused the temperature to rise to 63° C. Washing with water of 20 to 30° C. temperature was started 30 minutes later and continued for 4½ hours. The product was dried by heating to a final temperature of 140° C. in 80 minutes, and cooled rapidly. At room temperature, the product was an extremely viscous semi-solid having a melting point of 27° C. by Durran's Mercury Method and an epoxide equivalent weight of 249. This product will be referred to hereinafter for convenience as Epoxy Resin I.

EXAMPLE II

Instead of using 2.6 moles of epichlorhydrin per mole of bis-phenol as described in the above example, there was employed only 2.0 moles of epichlorhydrin per mole of bis-phenol. About 798 parts of bis-phenol were dissolved in a caustic soda solution made by dissolving 200 parts of sodium hydroxide in 1730 parts of water in a stainless steel closed kettle. Epichlorhydrin in amount of 650 parts was then added in one portion to the closed kettle, the mixture being stirred during the addition. The temperature rose from 37° C. to 70° C. in 45 minutes. Caustic soda, 80 parts in 200 parts of water, was then added whereupon the temperature rose to about 82° C. during a further 30 minutes. Additional caustic soda, 29 parts in 100 parts of water, was then added and the kettle contents were heated. The temperature of the reaction mixture was gradually increased to about 95° C. in approximately 30 minutes. The aqueous liquor was next drawn off from the taffy-like product which had formed. The latter was washed with hot water while agitated and a series of washing treatments applied until the water was neutral to litmus. The product was then dried by heating to a final temperature of 130° C. and removed from the kettle. The softening point of the resulting glycidyl ether was 43° C. by Durran's Mercury Method and the epoxide equivalent weight was 325. The average molecular weight measured ebullioscopically in ethylene dichloride was 510. This product will be known hereinafter as Epoxy Resin II.

The glycidyl ethers of a polyhydric phenol employed as principal resinifying constituent in the composition has a 1,2-epoxy equivalency greater than 1.0, and is usually between 1.0 and 2.0. The 1,2-epoxy equivalency is the value obtained upon dividing the average molecular weight of the ether by the epoxide equivalent weight thereof. Thus the epoxy equivalency of Epoxy Resin II was 1.57.

The epoxide equivalent weight of the glycidyl ethers of polyhydric phenols is determined by heating a one gram sample of the ether with an excess of pyridinium chloride dissolved in pyridine (made by adding pyridine to 16 cc. of concentrated hydrochloric acid to a total volume of one liter) at the boiling point for 20 minutes whereby the pyridinium chloride hydrochlorinates the epoxy groups to chlorhydrin groups. The excess pyridinium chloride is then back titrated with 0.1 N sodium hydroxide to the phenolphthalein end point. The epoxide value is calculated by considering one HCl as equivalent to one epoxide group. This method is used for obtaining all the epoxide values discussed herein.

The use of granular alumina with the glycidyl ether of a dihydric phenol has been discovered to produce a composition which after curing by incorporation therewith of a hardening agent yields a material of great strength which is ideally suited for adhesively bonding together of articles. The comminuted alumina is either of ordinary type, or is the so-called activated type characterized by high adsorptive properties. If desired, bauxite may be used provided it contains aluminum as major metal constituent thereof.

The granular size of the alumina may be varied considerably, although it is preferred to use material passing a 10 mesh A. S. T. M. screen. Excellent results are obtained with 200 to 400 mesh granular alumina.

In general, it is desirable to use about an equal amount of alumina with the epoxide-containing constituents in the composition—i. e., about an added 100% of alumina. However, other portions may be employed if desired such as from about an added 25% to 200%. In general, the use of about 100% added alumina gives cured compositions having better heat resistance than with those containing lesser amounts although an added 50% to 125% gives good results.

An embodiment of the invention is a composition adapted for adhesive purposes upon addition of a hardening agent which comprises glycidyl ether of a dihydric phenol having a 1,2-epoxy equivalency greater than 1.0 in admixture with an added 25 to 200% of comminuted alumina, which percentage is based upon the amount by weight of the glycidyl ether.

The glycidyl ether of a dihydric phenol employed as primary resin-forming constituent of the composition are very viscous to solid substances at ordinary atmospheric temperature of 20 to 25° C. In order to enable incorporation of the granular alumina therein, the ether is heated to a fluid consistency. The alumina is then added and mixed until substantially uniform distribution is achieved. In all the compositions of the invention, it is desirable to have the comminuted alumina substantially uniformly mixed therein. Mixing with the aid of a ball mill or dough mixer gives excellent uniformity.

Another convenient means for obtaining fluidity for the glycidyl ether of a dihydric phenol is to mix therewith a normally liquid glycidyl ether of a polyhydric alcohol and/or a mono-epoxy compound. Since both of these substances are capable of reacting in the same manner as the principal glycidyl ether, they do not adversely affect the properties of the compositions. In fact, it has been found that the properties of the cured compositions are enhanced by their presence. Furthermore, the fluidity realized not only enables ready incorporation of the alumina without heating, but also permits application of the composition as an adhesive at ordinary temperature.

The mono-epoxy compound which may be used as a reactive diluent in the composition contains but a single epoxy group, is a liquid at ordinary temperature, and has a low viscosity such as less than 5 poises at 25° C. These are the only essential limitations on the suitability of any particular compound although it is preferred that the compound be devoid of any other group reactive with glycidyl ethers. In being a mono-epoxy compound, customary usage of the word epoxy is employed, namely, that the compound contains a structure in which an oxygen atom has the two bonds thereof linked to different saturated carbon atoms which are vicinal carbon atoms in being also linked directly together. The compounds thus contain the group

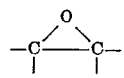

The epoxy group may either be in terminal location or be interior groups. Among representative compounds suitable for incorporation in the composition are propylene oxide, butylene oxide, isobutylene oxide, butadiene monoxide, 1,2-pentylene oxide, 2,3-hexylene oxide, 3,4-hexylene oxide, 3-ethyl-2,3-pentylene oxide, epichlorhydrin, epibromhydrin, octylene oxide, styrene oxide, glycidol, decylene oxide and the like. It is preferred to use a mono-epoxy compound which is substantially non-volatile at ordinary temperature such as is the case with those having a boiling point above 100° C. at normal atmospheric pressure. Among the members of this preferred class of mono-epoxy compounds are the monoglycidyl ethers including methyl, ethyl, isopropyl, allyl, crotyl, isoamyl, phenyl, o-tolyl, p-tolyl, thymyl, and naphthyl glycidyl ethers.

The mono-epoxy compound is a particularly useful constituent to enable the composition of the invention to have a spreadably fluid consistence at ordinary temperature so as to permit application thereof as an adhesive. Such compositions contain sufficient normally liquid mono-epoxy compound mixed with the glycidyl ether of the polyhydric phenol that the composition has the desired spreadable fluidity. Ordinarily it is desired that the mixture have a viscosity of from about 30 to 100 poises at 25° C. although it may be considerably less such as down as low as 3 poises. Most preferably, the viscosity is about 40 to 70 poises for suitable fluidity in adhesive applications, to which purpose the compositions are particularly adapted.

The proportion of mono-epoxy compound utilized in the composition to attain a desired viscosity for the mixture will of course vary and be dependent upon the viscosity of the glycidyl ether of the polyhydric phenol and the viscosity of the mono-epoxy compound. In general, the glycidyl ethers of the dihydric phenols are very viscous liquids to solids at 25° C. and thus have a viscosity of at least 150 poises at 25° C. There is no particular upper limit of viscosity for suitability although ethers having a melting or softening point above 160° C. by Durran's Mercury Method are rarely used. Thus the glycidyl ethers may have a viscosity of at least 150 poises at 25° C., and the viscosity may be so high that the ethers are solids at this temperature. Best results are obtained with ethers having a Durran's Mercury Method melting point of from about 10° C. to 50° C. In some cases, it may be desirable to use an ether having a melting point as high as 110° C.

The fluidity-imparting mono-epoxy compound is a liquid at 25° C. and in general is no more viscous than glycerine—i. e., has a viscosity of less than 5 poises at 25° C. Most of the mono-epoxy compounds are not nearly so viscous as glycerine, many being only a little more viscous than water. Thus, the viscosity of mono-epoxy compounds is ordinarily from about 1 to 500 centipoises at 25° C.

The composition containing the granular alumina in admixture with the glycidyl ether of a polyhydric phenol is at times used with an additional component therein, namely, a polyglycidyl ether of a polyhydric alcohol. If desired, the composition may also contain a mono-epoxy compound in combination with the polyglycidyl ether. The polyglycidyl ether is a glycidyl ether of a polyhydric alcohol containing a plurality of glycidyl groups. These include such polyglycidyl ethers as diglycidyl ethers of ethylene glycol, propylene glycol, trimethylene glycol, butylene glycol, diethylene glycol, triethylene glycol, glycerol, tripropylene glycol, and the like as well as ethers containing more than two glycidyl groups such as the polyglycidyl ethers of glycerol, diglycerol, erythritol, pentaglycerol, pentaerythritol, mannitol, sorbitol, polyallyl alcohol, polyvinyl alcohol and the like. Such glycidyl ethers also have a 1,2-epoxy value greater than 1.0.

The polyglycidyl polyethers of the polyhydric alcohols are prepared by reacting the polyhydric alcohol with epichlorhydrin in the presence of 0.1 to 2% of an acid-acting compound as catalyst such as boron trifluoride, hydrofluoric acid or stannic chloride whereby the chlorhydrin ether is formed as product. The reaction is effected at about 50° C. to 125° C. with the proportions of reactants being such that there is about one mole of epichlorhydrin for each molecular equivalent of hydroxyl group in the polyhydric alcohol. Thus, in preparing the ether of diethylene glycol, which glycol contains two hydroxyl groups in each molecule thereof, about two moles of epichlorhydrin for each mole of diethylene glycol are used. The resulting chlorhydrin ether from the reaction of a polyhydric alcohol with epichlorhydrin is dehydrochlorinated by heating at about 50° C. to 125° C. with a small, say 10% stoichiometrical excess of a base. For this purpose, sodium aluminate gives good results.

Preparation of the polyglycidyl ethers of polyhydric alcohols may be illustrated by considering application of the above method to preparation of the polyglycidyl ether of glycerol.

EXAMPLE III

In parts by weight, about 276 parts of glycerol (3 moles) were mixed with 828 parts of epichlorhydrin (9 moles). To this reaction mixture were added 10 parts of a diethyl ether solution containing about 4.5% of boron trifluoride. The temperature rose as a result of the exothermic reaction and external cooling with ice water was applied so as to keep the temperature between about 50° C. and 75° C. during a reaction period of about 3 hours. About 370 parts of the resulting glycerol-epichlorhydrin condensate were dissolved in 900 parts of dioxane containing about 300 parts of sodium aluminate. While agitating, the reaction mixture was heated and refluxed at 93° C. for 9 hours. After cooling to atmospheric temperature, the insoluble material was filtered from the reaction mixture and low boiling substances removed by distillation to a temperature of about 205° C. at 20 mm. pressure. The polyglycidyl ether, in amount of 261 parts, was a pale yellow, viscous liquid. It has an epoxide value of 0.671 equivalent per 100 grams and the molecular weight was 324 as measured ebullioscopically in a dioxane solution. These values showed that the polyglycidyl ether had a 1,2-epoxy equivalency of 2.18—i. e., an average of about 2.2 epoxide groups per molecule. For convenience, this product will be known as "Epoxy Resin III."

Various proportions of the polyglycidyl ether of the polyhydric alcohol is used with the glycidyl ether of a dihydric phenol such as an added 0 to 200%. Good results are obtained with the polyglycidyl ether constituting about 30 to 60% of the resin-forming mixture. In compositions containing three reactive epoxy-containing substances, the composition contains about 50 to 80% of the glycidyl ether of a polyhydric phenol, about 10 to 40% of the polyglycidyl ether of a polyhydric alcohol, and 1 to 30% of the mono-epoxy compound, the total of the percentage being 100. To this mixture is then added the desired amount of comminuted alumina such as an added 50 to 150%. It should be recognized that the proportions of ingredients may be varied to meet particular needs and that the above merely constitutes a general guide.

In using the compositions of the invention, there is added thereto a hardening agent. Upon the addition of the hardening agent, the composition begins to cure and harden even at ordinary temperature. A great variety of substances are now known to be hardening agents for the resin-forming ingredients of the composition such as alkalies like sodium or potassium hydroxide; alkali phenoxides like sodium phenoxides; carboxylic acids or anhydrides such as formic acid, oxalic acid or phthalic anhydride; Friedel-Craft metal halides like aluminum chloride, zinc chloride, ferric chloride or boron trifluoride as well as complexes thereof with ethers, acid anhydrides, ketones, diazonium salts, etc.; phosphoric acid and partial esters thereof including n-butyl orthophosphate, diethyl orthophosphate and hexaethyl tetraphosphate; and amino compounds such as triethyl amine, ethylene diamine, diethyl amine, diethylene triamine, triethylene tetramine, dicyandiamide, melamine and the like. The hardening agent is added and mixed in with the composition in order to effect hardening. The amounts vary considerably depending upon the particular agent employed. For the alkalies or phenoxides, 2 to 4 per cent is suitable. With phosphonic acid and esters thereof, good results are obtained with 1 to 10 per cent added. The amino compounds are used in amounts of about 5 to 15 per cent and the others involve addition of about 1 to 20 per cent.

In applying the composition for adhesive purposes, the glycidyl ether of the polyhydric phenol has added thereto sufficient mono-epoxy compound so that a spreadably fluid and homogeneous mixture is obtained. The hardening agent is then mixed with the composition and the mixture is applied as by spreading upon a surface desired to be united to another surface at a thickness of about 0.0005 to 0.1 inch thickness. The adhesive mixture is suitable for uniting various surfaces such as wood, wood to metal, metal to metal, resin to resin or any combination thereof. After application and joinder of the surfaces desired to be united, the adhered articles are allowed to cure for a period of from about 30 minutes to a day or more, depending upon the hardening agent employed. In this time, the adhesive composition will set up to a solid which will permit ordinary handling thereof. Maximum strength for the adhesive layer will be reached within one or two weeks. While the application is effected at ordinary atmospheric temperature and the curing may also be permitted to occur at such temperatures, the curing may be effected in shorter times at elevated temperatures such as up to 75° C., 100° C., 150° C. or even higher in some cases. In cases where elevated curing temperature is employed, the chosen temperature is below the boiling temperature of the lowest boiling constituent contained in the mixture, and preferably, it is at least 20° C. below such boiling temperature.

A better understanding of the nature of the invention and its advantages will be attained by considering some particular applications and comparisons thereof.

A resin-forming mixture of epoxy compounds was prepared containing 75% of the glycidyl ether of bis-phenol prepared as described in Example I (Epoxy Resin I) and 25% of the polyglycidyl ether of glycerol of Example III (Epoxy Resin III). To this mixture was added the various substances noted in Table I below, each of which was in finely divided or powdered condition. There was then mixed in 8 parts by weight of diethylene triamine per 100 parts of the mixture of epoxy compounds as curing agent therefor.

The adhesive properties were tested with blocks of about one quarter inch thickness consisting of linen cloth laminated together with phenol-formaldehyde resin. The freshly prepared adhesive mixtures were spread on a one inch square surface of each of two phenolic blocks with the aid of a doctor blade having a clearance of 0.005 inch. The coated surfaces of the two blocks were then united and the joined blocks placed in a constant temperature room set at 77° F. Glued blocks were removed from the constant temperature after 6 days' time and subjected to the block shear test of the Army-Navy-Civil Committee on Aircraft Design Criteria: "Wood Aircraft Inspection and Fabrication," ANC-19 (Dec. 20, 1943) discussed in an article by R. C. Rinker and G. M. Kline, Modern Plastics, vol. 23, p. 164, 1945. The shear strength of phenolic blocks glued with the different compositions in pounds per square inch are listed in Table I.

Since it is necessary that adhesively united articles also be resistant against shock, the impact strength of the cured compositions employed to unite aluminum was determined. The impact strength was tested on an assembly consisting of a 1½ inch diameter aluminum pipe, to the end of which was glued an aluminum disc. The glued area was approximately one-half square inch. The pipe having the disc glued to the lower end thereof was fastened in vertical position, and a 1½ pound rod was dropped for various distances at intervals of 3 inches upon the disc. A glue bond requiring a drop of 12 inches would consequently have an impact strength of approximately 3 foot-pounds per square inch.

Table I gives data which demonstrates the superior shear strength and impact strength obtained with compositions of the invention containing granular alumina.

*Table I*

| Parts Additive per 100 parts Epoxy Compounds | Shear Strength, lbs. per sq. in. | Impact Strength, ft. lbs. per sq. in. |
| --- | --- | --- |
| 60 Aluminum powder | 1,080 | 1.5 |
| 60 Walnut Shell flour | 3,670 | 1.5 |
| 60 Cotton flock | 3,790 | 2.3 |
| 50 Al$_2$O$_3$ | | 3 |
| 100 Al$_2$O$_3$ | 4,120 | 3.5 |

Adhesive bonds must not only have high shear strengths, but the strength should not be lessened to great extent at moderately elevated temperatures. Moreover, contact with water should not destroy the shear strength as is the case with animal glues. Data on the composition containing powdered alumina for comparison with compositions containing other substances are given in Table II.

The compositions were prepared from a mixture consisting of 75 parts by weight of Epoxy Resin I, 25 parts of Epoxy Resin III and 10 parts of allyl glycidyl ether. To this mixture of epoxy compounds there was introduced the indicated kind and amount of additive. About 12.5 parts of triethylamine were employed as curing agent. The shear strengths were determined using the phenolic linen blocks as described above, the only difference being that the joined blocks were cured for 6 days at 77° F. Shear strengths were determined at room temperature (about 20–25° C.), at 90° C. and after immersing the blocks in boiling water for an hour. The impact strengths of the compositions cured at 77° F. for 6 days were determined as described hereinbefore. The superior properties of the composition of the invention are self-evident from the results given in the table.

Table II

| Parts Additive per 100 parts Epoxy Compounds | Shear Strength (lbs. per sq. in.) | | | Impact Strength, ft. lbs. per sq. in. |
|---|---|---|---|---|
| | At Room Temp. | At 90° C. | After 1 hr. in boiling water | |
| 27.5 calcinated magnesia | 2,590 | 1,850 | 830 | 1.3 |
| 55 wood flour | 1,060 | 2,170 | 430 | 1.3 |
| 110 Al₂O₃ | 4,890 | 4,610 | 1,670 | 2.1 |

The favorable effect gained by use of a monoepoxy compound along with powdered alumina is illustrated by the results given in Table III. The mixtures containing the indicated compositions were cured for 144 hours at 77° F. after addition thereto of 12.5 parts of triethylamine and application to phenolic linen blocks. The shear strengths noted in the table were obtained as described.

Table III

| Composition in parts by weight | | | | Shear strength (lbs. per sq. in.) | | | |
|---|---|---|---|---|---|---|---|
| Epoxy Resin I | Epoxy Resin III | Allyl Glycidyl Ether | Al₂O₃ | At Room Temp. | At 105° C. | After 1 hr. in boiling water | After 1 week in water |
| 75 | 25 | 0 | 0 | 3,300 | 150 | 1,130 | 1,950 |
| 75 | 25 | 10 | 0 | 2,760 | 430 | 2,740 | 2,840 |
| 75 | 25 | 10 | 100 | 3,750 | 1,650 | 3,930 | 2,890 |

The use of certain other mono-epoxy compounds as reactive diluents in the composition are illustrated by the results given in Table IV. A mixture of 75 parts by weight of Epoxy Resin I and 25 parts of Epoxy Resin III was used, to which mixture of epoxy compounds was added the indicated kind and amount of reactive diluent. Instead of using a pure alumina, there was employed 100 parts of powdered bauxite consisting of alumina containing about 17.5% iron oxide. The compositions had 12.5 parts of triethylamine added as curing agent and curing was effected by storage at 77° F. for 6 days' time.

Table IV

| Reactive Diluent in parts by weight of Epoxy Resins | Shear Strength (lbs. per sq. in.) | | | | Impact Strength, ft. lbs. per sq. in. |
|---|---|---|---|---|---|
| | at Room Temp. | at 105° C. | After 1 hr. in boiling water | using aluminum blocks | |
| 5 butadiene monoxide | 4,120 | 740 | 4,920 | 1,260 | 2.7 |
| 10 butadiene monoxide | 2,640 | 1,080 | 5,515 | 1,810 | 4.0 |
| 5 propylene oxide | 2,920 | 1,450 | 3,450 | 1,435 | 3.8 |
| 10 propylene oxide | 4,430 | 680 | 4,590 | 1,215 | 5.6 |

A preferred composition consisting essentially of 75 parts by weight of Epoxy Resin I, 25 parts of Epoxy Resin III, 10 parts of allyl glycidyl ether and 100 parts of comminuted alumina has a light gray color, a specific gravity of 1.74 and a viscosity at 25° C. of 300 poises. The composition, without curing agent, is stable over a wide range of storage temperature up to approximately 175° F. The original viscosity will not change even if uncovered since no volatile solvent is present. The dispersed alumina will not settle especially if the composition is ball-milled. The composition cures at ordinary temperature upon addition of a hardening agent; 12.5 parts of triethylamine or 8 parts of diethylene triamine being about optimum. The usable pot life of the composition containing the hardening agent is the length of time required for the composition to reach a viscosity of 1000 poises. With triethylamine, the pot life is about 7 hours and with diethylene triamine it is 30 to 35 minutes. In using the composition containing the hardening agent for adhesive purposes, sufficient strength is attained in 24 hours at ordinary atmospheric temperature of about 77° F. to permit careful handling and optimum strength is achieved after about 120 to 144 hours.

The preferred composition containing also the optimum amount of triethylamine as curing agent as utilized as an adhesive for gluing phenolic linen blocks for determination of shear strengths at various temperatures. For purposes of comparison, a number of commercial adhesives noted by their trade-names in Table V were also tested. The commercial adhesives were subjected to cure conditions recommended by their manufacturer. The outstanding properties of the composition of the invention are apparent from the results given in the table.

Table V

| Adhesive | Cure treatment | Shear Strength (lbs. per sq. in.) at— | | | | | | Impact Strength, Ft.-lbs. per sq. in. |
|---|---|---|---|---|---|---|---|---|
| | | −80° C | 20° C. | 75° C. | 90° C. | 120° C. | After 1 hr. in boiling H₂O | |
| Epoxy adhesive | 6 days at 77° F | 4,670 | 4,000 | 3,570 | 2,900 | 1,000 | 3,970 | 2.0 |
| Cycloweld 55-9 | 20 min. at 320° F | 1,560 | 2,330 | 900 | 1,300 | 630 | 1,200 | 1.4 |
| Cycloweld CB-4 | 20 min. at 300° F | 550 | 1,000 | 420 | 600 | 760 | 0 | 0.2 |
| Penacolite G-1131 | 6 days at 77° F | 140 | 260 | 60 | 500 | | 300 | 0.1 |
| Du Pont 4653 | do | 600 | 125 | 60 | 0 | | 250 | 0.6 |
| Phenac Adhesive 703 | do | 220 | 580 | 520 | 150 | | 90 | |
| Plycozite | 20 min. at 320° F | 700 | 1,100 | 500 | 200 | | 300 | 0.9 |

The compositions of the invention are particularly adapted for use in bonding together of solid surfaces which may be of any suitable variety or combination such as wood to wood, wood to resin, resin to resin, metal to metal, metal to wood, metal to glass, glass to glass, etc. The surfaces may be either smooth or rough though in all cases it is desirable that they be clean—i. e., free of oil or grease.

I claim as my invention:

1. A composition adapted for adhesive purposes upon addition of a hardening agent which comprises glycidyl ether of a dihydric phenol having a 1,2-epoxy equivalency greater than 1.0 in admixture with an added 25 to 200% of comminuted alumina, the percentage of added alumina being based upon the amount by weight of said glycidyl ether.

2. A composition comprising glycidyl ether of bis - (4 - hydroxyphenyl) - 2,2 - propane having a 1,2-epoxy equivalency between 1.0 and 2.0 in admixture with an added 25 to 200% of granular alumina capable of passing a 10 mesh A. S. T. M. screen, the percentage of added alumina being based upon the amount by weight of said glycidyl ether.

3. A composition comprising glycidyl ether of a dihydric phenol having a 1,2-epoxy equivalency between 1.0 and 2.0 and a viscosity of at least 150 poises at 25° C. and an added 0 to 200% of a polyglycidyl ether of a polyhydric alcohol in admixture with an added 25 to 200% of comminuted alumina, the percentage of added polyglycidyl ether being based upon the amount by weight of said glycidyl ether and the percentage of added alumina being based upon the total amount by weight of said organic constituents.

4. A composition comprising glycidyl ether of a dihydric phenol having a 1,2-epoxy equivalency between 1.0 and 2.0 and a viscosity of at least 150 poises at 25° C. and a fluidizing proportion of a liquid mono-epoxy compound having a viscosity below 5 poises at 25° C. in admixture with an added 25 to 200% of comminuted alumina, the percentage of added alumina being based upon the total amount by weight of said organic constituents.

5. A composition comprising glycidyl ether of bis - (4 - hydroxyphenyl) - 2,2 - propane having a 1,2-epoxy equivalency of between 1.0 and 2.0 and a viscosity at 25° C. of at least 150 poises and a fluidizing amount of allyl glycidyl ether in admixture with an added 50% to 125% of powdered alumina capable of passing a 10 mesh A. S. T. M. screen, the percentage of added alumina being based upon the total amount by weight of said organic constituents.

6. A composition comprising glycidyl ether of bis - (4 - hydroxyphenyl) - 2,2 - propane having a 1,2-epoxy equivalency of between 1.0 and 2.0 and a viscosity at 25° C. of at least 150 poises and a fluidizing amount of propylene oxide in admixture with an added 50% to 125% of powdered alumina capable of passing a 10 mesh A. S. T. M. screen, the percentage of added alumina being based upon the total amount by weight of said organic constituents.

7. A composition comprising glycidyl ether of bis - (4 - hydroxyphenyl) - 2,2 - propane having a 1,2-epoxy equivalency of between 1.0 and 2.0 and a viscosity at 25° C. of at least 150 poises and a fluidizing amount of styrene monoxide in admixture with an added 50% to 125% of powdered alumina capable of passing a 10 mesh A. S. T. M. screen, the percentage of added alumina being based upon the total amount by weight of said organic constituents.

8. A spreadably fluid composition comprising 50 to 80 parts by weight of glycidyl ether of dihydric phenol having a 1,2-epoxy equivalency between 1.0 and 2.0 and a viscosity at 25° C. of at least 150 poises, 10 to 40 parts of a polyglycidyl ether of glycerol, 1 to 30 parts of a liquid mono-epoxy compound having a viscosity below 5 poises at 25° C., the total parts being 100, in admixture with an added 50% to 125% of powdered alumina capable of passing a 10 mesh A. S. T. M. screen, the percentage of added alumina being based upon the total amount by weight of said organic constituents.

9. A spreadably fluid composition comprising 50 to 80 parts by weight of glycidyl ether of bis - (4 - hydroxyphenyl) - 2,2 - propane having a 1,2-epoxy equivalency between 1.0 and 2.0 and a viscosity at 25° C. of at least 150 poises, 10 to 40 parts of polyglycidyl ether of glycerol, 1 to 30 parts of allyl glycidyl ether, the total parts being 100, in admixture with an added 50% to 125% of granular alumina capable of passing a 10 mesh A. S. T. M. screen, the percentage of added alumina being based upon the total amount by weight of said organic constituents.

10. A spreadably fluid composition comprising 50 to 80 parts by weight of glycidyl ether of bis - (4 - hydroxyphenyl) - 2,2 - propane having a 1,2-epoxy equivalency between 1.0 and 2.0 and a viscosity at 25° C. of at least 150 poises, 10 to 40 parts of a polyglycidyl ether of glycerol, 1 to 30 parts of propylene oxide, the total parts being 100, in admixture with an added 50% to 125% of granular alumina capable of passing a 10 mesh A. S. T. M. screen, the percentage of added alumina being based upon the total amount by weight of said organic constituents.

11. A spreadably fluid composition comprising 50 to 80 parts by weight of glycidyl ether of bis - (4 - hydroxyphenyl) - 2,2 - propane having a 1,2-epoxy equivalency between 1.0 and 2.0 and a viscosity at 25° C. of at least 150 poises, 10 to 40 parts of a polyglycidyl ether of glycerol, 1 to 30 parts of styrene monoxide, the total parts being 100, in admixture with an added 50% to 125% of granular alumina capable of passing a 10 mesh A. S. T. M. screen, the percentage of added alumina being based upon the total amount by weight of said organic constituents.

12. A spreadably fluid composition comprising about 75 parts by weight of glycidyl ether of bis - (4 - hydroxyphenyl) - 2,2 - propane having a melting point of about 27° C. by Durran's Mercury Method and a 1,2-epoxy equivalency between 1.0 and 2.0, about 25 parts of polyglycidyl ether of glycerol having a 1,2-epoxy equivalency of about 2.2, and about 10 parts of allyl glycidyl ether in substantially uniform admixture with about 100 parts of comminuted alumina capable of passing a 10 mesh A. S. T. M. screen, the total parts of said ingredients in the composition being about 210.

13. A composition comprising glycidyl ether of a dihydric phenol having a 1,2-epoxy equivalency greater than 1.0 in admixture with an added 25 to 200% of comminuted bauxite containing aluminum as major metal constituent thereof, the percentage of added bauxite being based upon the amount by weight of said glycidyl ether.

14. A composition comprising glycidyl ether of bis - (4 - hydroxyphenyl) - 2,2 - propane having a 1,2-epoxy equivalency between 1.0 and 2.0 in admixture with an added 25 to 200% of granular bauxite capable of passing a 10 mesh A. S. T. M. screen and containing aluminum as major metal constituent thereof, the percentage of added bauxite being based upon the amount by weight of said glycidyl ether.

15. A composition comprising glycidyl ether of a dihydric phenol having a 1,2-epoxy equivalency between 1.0 and 2.0 and a viscosity of at least 150 poises at 25° C. and a fluidizing proportion of a liquid mono-epoxy compound having a viscosity below 5 poises at 25° C. in admixture with an added 25 to 200% of comminuted bauxite containing aluminum as major metal constituent thereof, the percentage of added bauxite being based upon the total amount by weight of said organic constituents.

16. A spreadably fluid composition comprising 50 to 80 parts by weight of glycidyl ether of dihydric phenol having a 1,2-epoxy equivalency between 1.0 and 2.0 and a viscosity at 25° C. of at least 150 poises, 10 to 40 parts of a polyglycidyl ether of glycerol, 1 to 30 parts of a liquid mono-epoxy compound having a viscosity below 5 poises at 25° C., the total parts being 100, in admixture with an added 50% to 125% of powdered bauxite capable of passing a 10 mesh A. S. T. M. screen and containing aluminum as major metal constituent thereof, the percentage of added bauxite being based upon the total amount by weight of said organic constituents.

QUENTIN T. WILES.

REFERENCES CITED

The following references are of record in the file of this patent:

UNITED STATES PATENTS

| Number | Name | Date |
| --- | --- | --- |
| 2,324,483 | Castan | July 20, 1943 |
| 2,444,333 | Castan | June 29, 1948 |
| 2,450,234 | Evans et al. | Sept. 28, 1948 |
| 2,467,171 | Werner et al. | Apr. 12, 1949 |